(12) United States Patent
Dicke et al.

(10) Patent No.: US 6,315,253 B1
(45) Date of Patent: Nov. 13, 2001

(54) FOLDABLE SUPPORTING DEVICE AND QUICK RELEASE MECHANISM THEREFOR

(75) Inventors: Grant D. Dicke; Jeffrey A. Williams, both of Downers Grove, IL (US)

(73) Assignee: Dicke Tool Company, Downers Grove, IL (US)

( * ) Notice: Subject to any disclaimer, the term of this patent is extended or adjusted under 35 U.S.C. 154(b) by 0 days.

(21) Appl. No.: 09/456,146

(22) Filed: Dec. 7, 1999

(51) Int. Cl.⁷ .................................................. A47B 91/00
(52) U.S. Cl. ...................... 248/188.7; 248/166; 248/170; 403/96
(58) Field of Search ............................ 248/188.7, 188.6, 248/170, 168, 519, 439; 403/96, 93, 92

(56) References Cited

U.S. PATENT DOCUMENTS

| | | | |
|---|---|---|---|
| 2,052,331 | * 8/1936 | White ................................. | 403/93 X |
| 2,221,932 | 11/1940 | Utley ..................................... | 155/141 |
| 2,497,552 | 2/1950 | Ledel ..................................... | 311/99 |
| 2,971,803 | 2/1961 | Wallin .................................... | 311/99 |
| 3,291,540 | 12/1966 | Doersam ................................ | 306/13 |
| 3,704,850 | 12/1972 | Hendrickson et al. ........... | 248/188.5 |
| 4,548,379 | 10/1985 | Seely et al. ........................ | 248/624 |
| 4,691,892 | 9/1987 | Grewe et al. ....................... | 248/624 |
| 4,693,444 | 9/1987 | Williams et al. .................... | 248/653 |
| 4,744,536 | 5/1988 | Bancalari ............................. | 248/125 |
| 4,954,008 | 9/1990 | Dicke et al. ........................... | 403/24 |
| 5,082,221 | 1/1992 | Lai ....................................... | 248/168 |
| 5,082,222 | * 1/1992 | Hsu ...................................... | 248/170 |
| 5,102,079 | 4/1992 | Lee ...................................... | 248/166 |
| 5,213,296 | * 5/1993 | Lee ...................................... | 248/166 |
| 5,310,145 | 5/1994 | Chen .................................... | 248/170 |
| 5,340,068 | 8/1994 | Sarkisian et al. .................. | 248/188.6 |
| 5,489,077 | * 2/1996 | Stoudt ................................ | 248/188.7 |
| 5,611,509 | 3/1997 | Kulp et al. ......................... | 248/188.7 |

FOREIGN PATENT DOCUMENTS 2 216 438   10/1973 (DE) .

* cited by examiner

Primary Examiner—Anita King
Assistant Examiner—Gwendolyn Baxter
(74) Attorney, Agent, or Firm—Fitch, Even, Tabin & Flannery (57) ABSTRACT

A quick release mechanism for a sign stand base having support legs pivotally joined to a support flange. The support legs are notched to receive the support flange. A locking pin extends through the support leg and is positioned so s to selectively interfere with an outer periphery of the support flange. The locking pin is mounted for rocking or swiveling motion within the support leg and can be moved out of contact with the support flange, thereby allowing the support leg to pivot with respect to the support flange. A flat spring strip secured to an outer surface of the support leg biases the locking pin to a position engaging the support flange.

22 Claims, 6 Drawing Sheets

FOLDABLE SUPPORTING DEVICE AND QUICK RELEASE MECHANISM THEREFOR

BACKGROUND OF THE INVENTION

1. Field of the Invention

The present invention pertains to supporting devices such as those used to support roadway signs and barriers to advise nearby motorists and bystanders of construction sites and other hazards. The present invention also pertains to quick release mechanisms for deploying the supporting device.

2. Description of the Related Art

There has been increasing demand for warning and advisory information concerning worksite activities. For example, organizations charged with safety concerns have come to increasingly appreciate the effectiveness of lightweight temporary sign stands to warn oncoming motorists of nearby work activities. Typically such lightweight sign stands are made to be collapsible for compact storage. In order to complement the sign stand, the sign panels are made of lightweight foldable material. Such completed sign stand assemblies may be conveniently stored in work vehicles, available for ready deployment, thereby bypassing the need to withdraw the sign stand assemblies at a remote location and to schedule their delivery to the worksite. Such sign stand assemblies have offered a great advantage for work operations which last only a day, or part of a day. Work situations of this type present unique demands not associated with long term projects, since motorists will not encounter the worksite on a repeated basis and thus will not have the benefit of past experience as a forewarning. It is important that the sign stand assemblies offer reliable advisory and instructional assistance, particularly for motorists traveling at highway speeds. Sign stand assembles located adjacent a highway must withstand wind gusts generated by moving vehicles as well as wind gusts occurring at outdoor locations, which are usually unabated, especially for multiple lane highway constructions.

Substantial advances have been made in the art of lightweight collapsible sign stand assemblies. For example, commonly assigned U.S. Pat. No. 4,954,008 has been met with ready commercial acceptance and has been recognized not only for its provision of a strong reliable sign stand support, but has also been found to offer substantial labor savings when the sign stand is deployed, and again when the sign stand is collapsed for storage, after use. U.S. Pat. No. 4,954,008 provides a quick release mechanism located at the point where support legs are pivotally secured to a base for supporting the sign mast. The quick release mechanism is operated by depressing a lever arm in order to allow free rotating of the support leg with respect to the remainder of the sign stand assembly.

Frequently, sign stand assemblies must be erected or taken down in inclement weather. At times, the combination of wind gusts occurring during inclement weather and a sudden pressure burst from nearby traffic can substantially complicate a worker's task.

SUMMARY OF THE INVENTION

In researching ways in which sign stand assemblies can be improved, it has been discovered that different workers find manipulation of one type of quick release mechanism to be easier in a particular situation than other types of quick release mechanisms.

Improvements in sign stand assemblies are continually being sought. It is an object of the present invention to provide quick release mechanisms having different types of actuating motions associated with the deployment or storage of support legs pivotally mounted to a support base.

Another object of the present intention is to provide sign stand assemblies having improved stronger joinder of support legs to a support base.

A further object of the present invention is to provide support bases and quick release mechanisms therefor constructed from a minimum number of inexpensive components.

These and other objects of the present invention are provided in a foldable supporting device comprising:

a base member including a plurality of support flanges having respective outer peripheries;

a plurality of legs pivotally mounted to respective support flanges for pivotal movement between operational and storage positions;

said legs defining a slot for receiving portions of a respective support flange outer periphery as the leg is pivoted between unfolded and folded positions;

the outer peripheries of the support flanges defining at least one locking recess;

a plurality of locking pins extending through respective legs, the locking pins having an elongated double-ended body with an enlarged head at one end lying outside the leg and an exposed portion at the other end extending beyond the leg;

the locking pins carried by the legs so as to be positioned adjacent.the support flange outer periphery and so as to be movable between a locked position received in the locking recess and an unlocked position outside of the locking recess;

a plurality of spring bias means carried on respective legs so as to urge the locking pin body into the recess to lock the leg against pivoting about the support flange; and the locking pin movable out of the recess when the exposed portion is deflected so as to oppose the force of the spring bias means.

DETAILED DESCRIPTION OF THE PREFERRED EMBODIMENTS

Figure 2:
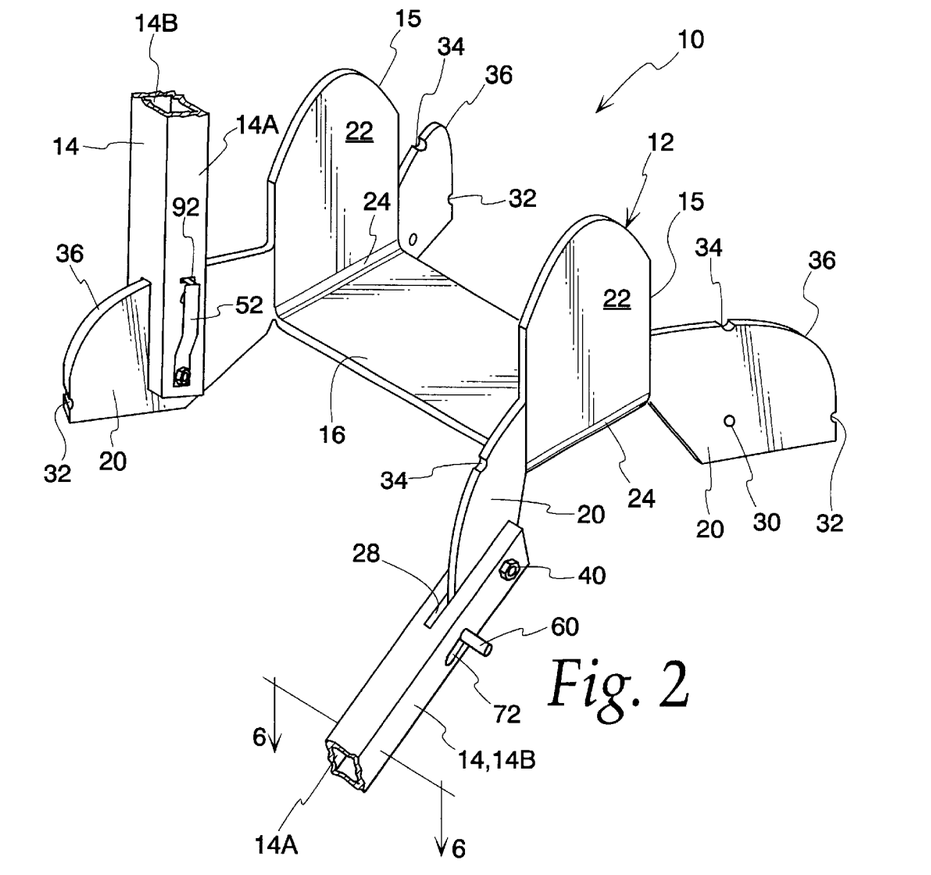
FIG. 2 is a fragmentary perspective view of a sign stand support base.
Figure 3:
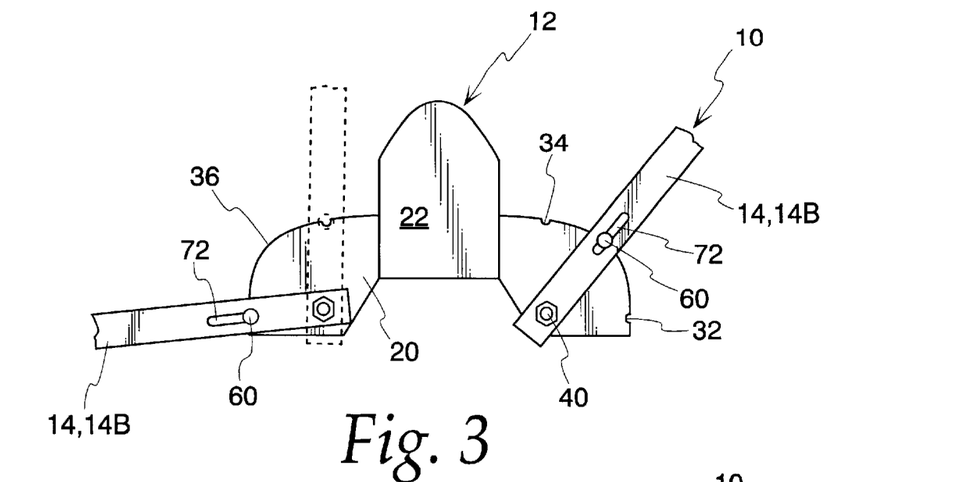
FIG. 3 is a side elevational view thereof.
Figure 4:
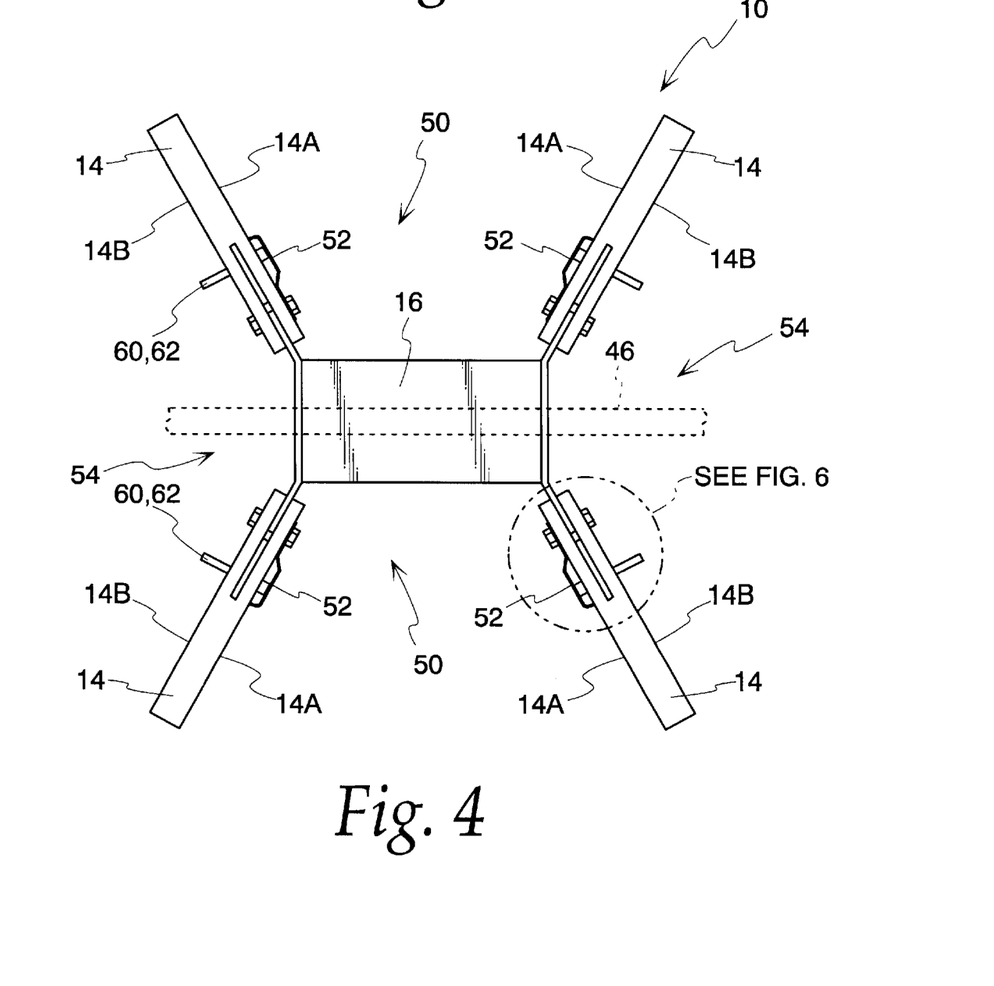
FIG. 4 top plan view thereof.

Referring now to the drawings, and initially to FIGS. 1–4, a foldable supporting device is generally indicated at 10. The foldable supporting device includes a support base 12 and a plurality of support legs 14. In the preferred embodiment, four support legs are employed, as shown in FIG. 4. Two of these support legs have been omitted from FIG. 2 for clarity of illustration.

In the preferred embodiment, support base 12 is provided as a weldment including side plates 14 and a floor member 16. Side plates 14 are preferably formed as a monolithic stamping of sheet metal material. Side plates 14 are stamped to form a pair of support flanges 20 extending from an intermediate upright wall 22. The upright wall 22 is joined to floor 16 by a metallurgical joinder 24 by welding, brazing or the like conventional joining technique. In the preferred embodiment shown in FIG. 10, the support base 12 is covered by a hood member so as to enclose one or more springs for biasing an upright sign mast extending above the support base. Another example of the hood and sign mast arrangement is shown in commonly assigned U.S. Pat. No. 4,954,008, the disclosure of which is hereby incorporated by reference as if fully set forth herein.

As will be seen, for example in FIG. 2, legs 14 are of preferably rectangular, most preferably square tubing which are bifurcated or split at one end by an elongated notch 28. If desired, legs of cylindrical or other shape can be used. The notch 28 is dimensioned to receive the support flanges 20 of support base 12. Preferably, the support flanges 20 are of generally planar configuration, although other configurations may be employed for the support flanges 20. As can be seen in the right hand portion of FIG. 2, the support flanges 20 are provided with an aperture 30 and recesses 32,34 spaced about an outer periphery 46 of the support flange. Pivot shafts in the form of bolt fasteners 40 pass through apertures 30 as well as complementary apertures formed in the legs 14, so as to pivotally join the legs to corresponding support flanges 20. The notches 28 are dimensioned so as to clear the outer periphery of the support flange allowing the legs to swing between opened and storage positions illustrated in solid lines and phantom lines, respectively, in the left hand portion of FIG. 3. The leg 14 shown in the foreground portion of FIG. 2 is fixed in the open or deployed position extending at a relatively small acute angle to a support surface. The leg 14 shown in the background portion of FIG. 2 is locked in a closed or storage position, generally upright, at a normal angle to a support surface.

In the preferred embodiment, the peripheral portion 35 of flange 20 is made part circular and the notch 28 formed in leg 14 for receiving the flange is closely spaced with respect to the support flange outer periphery, as indicated in the background portion of FIG. 2. The notch 28 in the foreground portion of FIG. 2 is shown exaggerated in length for illustration purposes. With a close sliding fit of the flange 20 within leg 14, the leg receives continuous wobble-free support from the flange at all points of its operation between open and closed positions. If desired, the notch 28 can be made considerably larger than that needed to receive flange 20 and an optional sleeve or insert can be fitted within notch 28, although this has not been found necessary in the preferred embodiment, as illustrated.

Referring to FIG. 4, a portion of a sign panel 46 supported by mechanism 10 is shown in phantom. The areas designated by the numeral 50, herein the "inside portions" between sign legs 14 is located facing the planar faces of sign panel 46. Spring strips 52, one for each leg 14, are located in these inside areas. The "outside portions" between support legs 14 are designated by the reference numeral 54 and generally are located facing an edge of sign panel 46.

As shown in FIGS. 2 and 3, for example, the legs 14 are movable between an open or unfolded position shown at the bottom of FIG. 2 and a folded or storage position shown in the upper corner of FIG. 2. FIG. 3 shows, in its right hand portion, a leg 14 intermediate the deployed and storage positions which correspond to notches 32, 34, respectively. Turning now to FIGS. 1 and 5–7, a locking or detent mechanism for releasably securing the legs in either of the storage or deployment positions will now be described. As shown, a locking pin 60 is provided for each leg. As can best be seen in FIGS. 5–7, the locking pin 60 has a generally cylindrical body 62 and an enlarged head 64.

Figure 6:
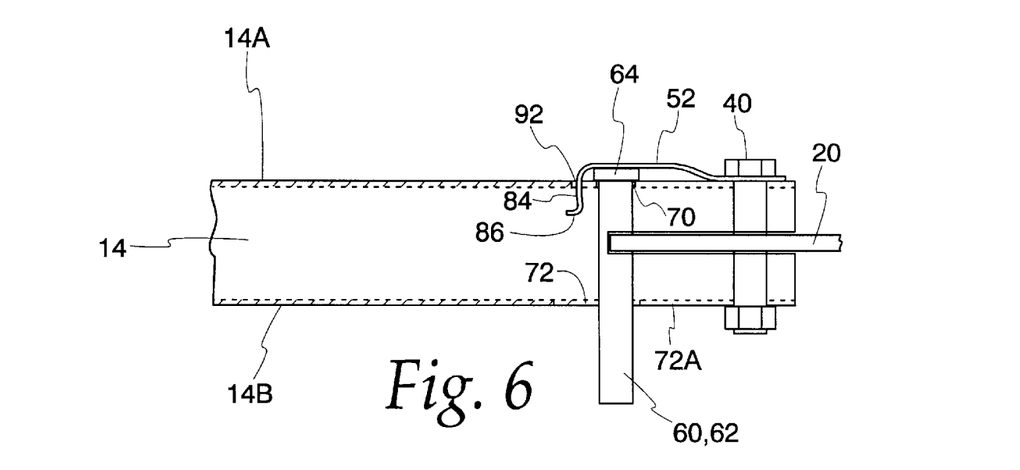
FIG. 6 shows a portion of FIG. 4 on an enlarged scale.
Figure 7:
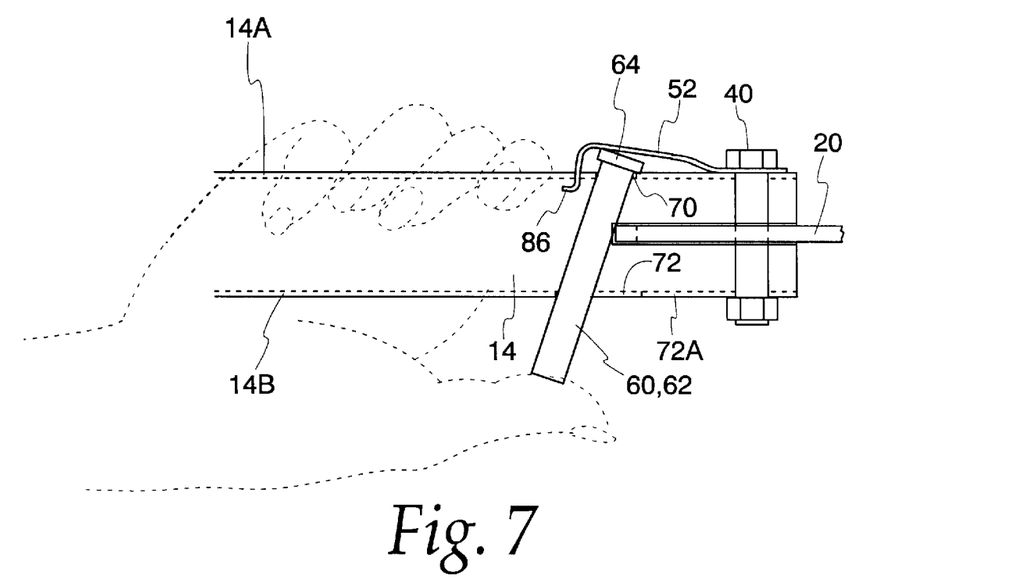
FIG. 7 is a view similar to that of FIG. 6 showing actuation of the locking pin thereof.
Figure 10:
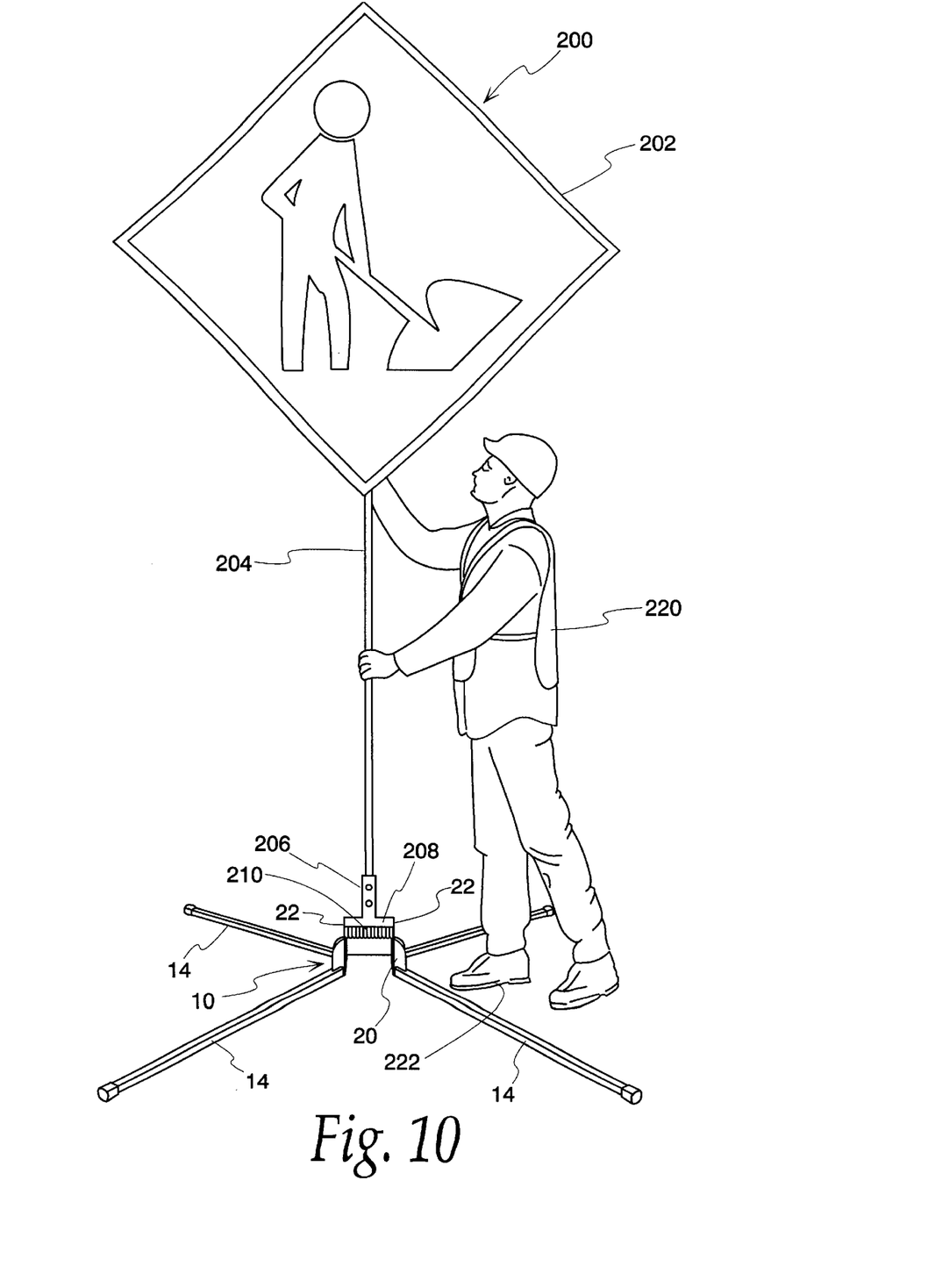
FIG. 10 is a perspective view of a sign stand according to the pent invention.

With reference to FIG. 2, it can be seen that legs 14 are of generally hollow tubular construction with opposed side walls 14a facing the "interior" of the support device and 14b facing outside of the support device so as to be visible when standing to one side of the support device, in the manner depicted in FIGS. 3 and 10. With reference to FIGS. 6 and 7, a hole 70 is formed in sidewall 14a of leg 14 and is closely dimensioned with respect to the cross-section of the body 62 of pin 60. As can be seen in FIG. 6, the pin body 62 extends through a slot 72 formed in leg sidewall 14b. Preferably, pin body 62 is dimensioned so as to extend a substantial amount beyond leg wall 14b with an exposed free end suitable for grasping to operate the locking arrangement of the support device.

As can be seen in FIG. 2, for example, locking pin 60 extends through a slot 72 formed in the outboard wall 14b of leg 14. As can be seen for example in FIG. 7, while the end of locking pin 60 adjacent head 64 is free only to pivot or rock, the free end 62 of locking pin 60 is free to swing an arc, being limited by the dimension of slot 72. As illustrated in FIG. 7, free end 62 of locking pin 60 is swung to its furthest, unlocked position. With additional reference to FIG. 2, the legs 14 are freed to pivot about their respective support flanges 20 with the support flanges passing through slot 28 formed in the legs 14. As previously mentioned, recesses or detents 332, 34 are formed in each support flange 20. FIG. 6 shown locking pin 60 engaged in a lower recess 32 of support flange 20, thus preventing rotation of the leg about threaded fastener 40. The location of hole 70 and the lengthwise dimension of slot 72 are chosen such that, with locking pin 60 swung to its furthest unlocked position shown in FIG. 7, interior portions of the locking pin body clear the support flange thereby allowing leg 14 to pivot about threaded fastener 40.

With reference to FIG. 7, unlocking of pin 60 from support flange 20 allows leg 14 to be swung in an upward direction. If desired, the locking pin can be released by the operator once the leg is unlocked, thereby allowing the locking pin to travel across the outer surface 36 of the support flange as the leg is swung to its upright storage position. On attaining the desired upright position, locking pin 60 falls into the recess 34 under bias force of spring 52, thereby securely locking the leg in a storage position. In the storage position (as shown in the upper left hand portion of FIG. 2 and in phantom in the left hand portion of FIG. 3), an upward deflection of the free end 62 of locking pin 60 will release the leg to fall toward its open position under the force of gravity. With sufficient travel of leg 14, the locking pin 60 carried with the leg will be urged into the lower recess 32 under force of spring strip 52.

Figure 5:
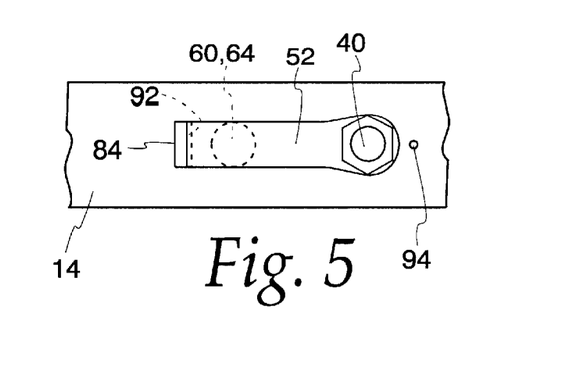
FIG. 5 is a side elevational view of the spring bias member.

With reference to FIGS. 5–7, it will be observed that spring 52 operates only on the enlarged head 64 of the locking pin. This arrangement provides substantial manufacturing advantages since springs internal to hollow legs 14 can be eliminated. Some operators of support devices prefer to visually observe operation of spring bias members and an advantage is obtained with the present invention, in the regard, as can be seen by comparing the position of spring 52 in FIGS. 6 and 7.

A further important advantage is obtained with the present invention in that the enlarged head 64 of the locking pin is substantially enclosed by the flat, smooth faced outer surfaces of spring strip 52. As can be seen for example in FIG. 2, the spring strips 52 are located in the "inside" surfaces of the legs 14, areas which are typically maintained clear of unwanted obstructions which may interfere with operation of the spring strips.

Figure 11:
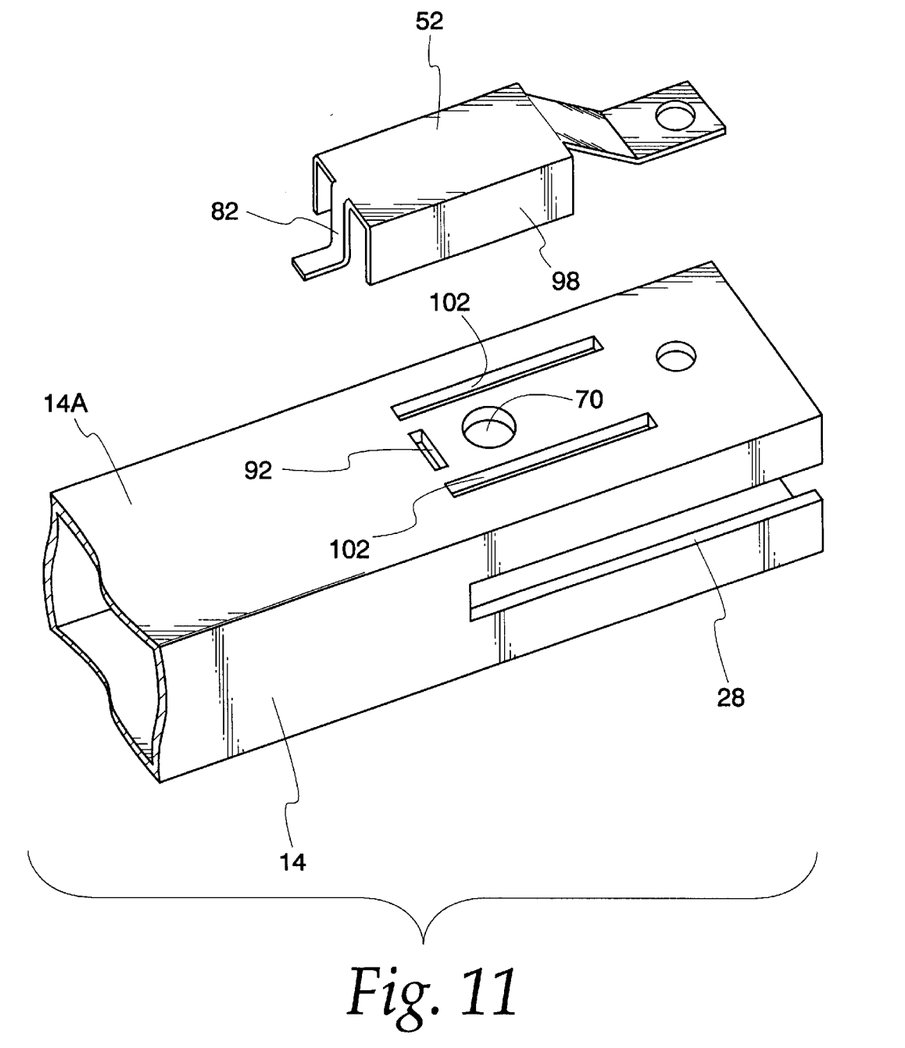
FIG. 11 is a fragmentary perspective view of an alternative spring bias arrangement.

If further "shielding" of enlarged head 64 is desired, the arrangement shown in FIG. 11 can be employed where sidewalls 98 are added to spring strip 52. As will be appreciated, the bias means shown in FIG. 11 can be readily formed using conventional metal stamping techniques. The sidewalls 98 are received in slots 102 formed in leg wall 14a. If desired, the slots 102, 92 can be merged to form a single continuous U-shaped slot and sidewalls 98 can extend to stop limit 82. In general, this extra degree of shielding has been found unnecessary.

Figure 1:
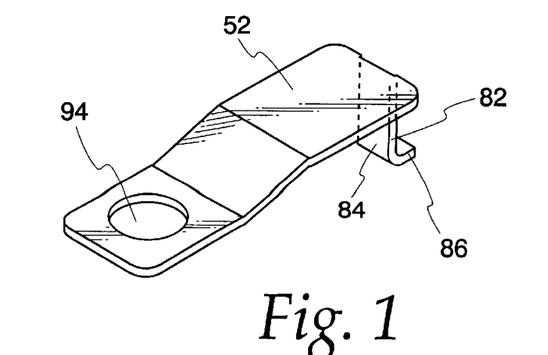
FIG. 1 is a perspective view of a spring bias member according to the principles of the present intention.

With reference to FIG. 1, additional protection for the spring strip 52 can be provided with an optional hook or L-shaped stop limit 82, preferably formed as part of the stamping of bias member 52. A first part 84 of stop limit 82 travels within a slot 92 formed in leg wall 14a. The slot guides the position of leg 84 as spring strip 52 is expanded.

A second part 86 of stop limit 82, in extreme excursions of the locking pin will contact the leg wall 14a in the manner indicated in FIG. 7, thus effectively preventing disengagement of the free end of spring strip 52 from leg 14.

The optional stop limit 82 of spring strip 52 also operates to prevent unwanted rotation of the spring strip and thereby further ensures that the enlarged head 64 of the lock pin will remain covered. If desired, other anti-rotation arrangements can be provided. For example, with reference to FIG. 5, an optional hole 94 can be formed in leg 14 to receive a projection (not shown) extending from the secured or closed end of the spring strip. For example, a finger-like portion (not shown) can extend from spring strip 52 adjacent threaded fastener 40, with the free end of the finger being inserted in hole 94.

As a further alternative, the round hole 94 shown in FIG. 1 can be replaced with a hole having an elongated, square or other non-round edge. For example, a pair of opposed elongated slots can extend outwardly from round hole 94 to receive a pair of complementary-shaped locking ears extending from the enlarged head of threaded fastener 40.

Figure 8:
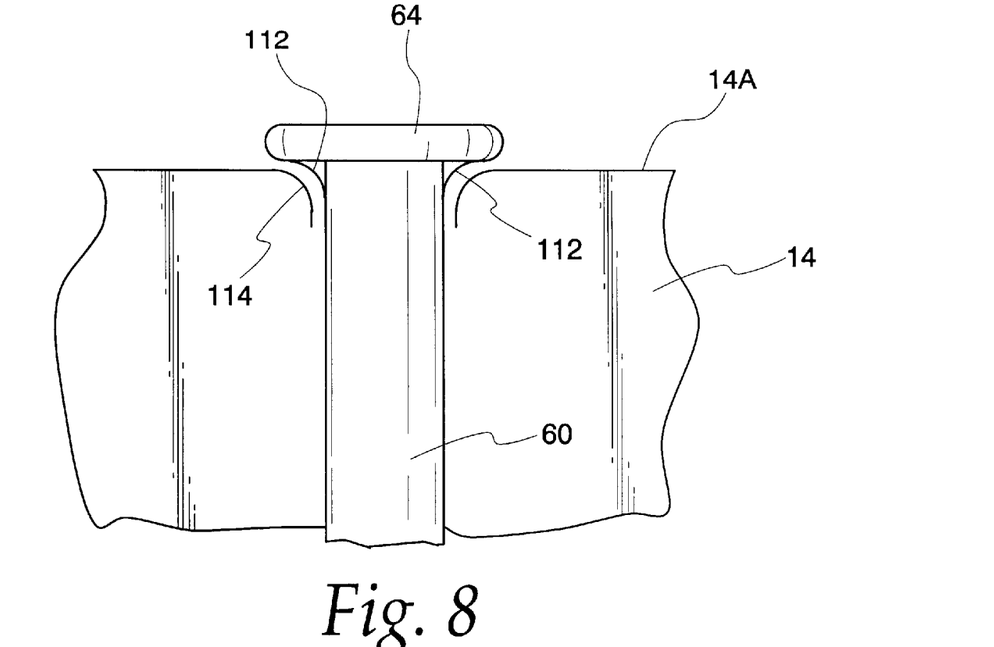
FIG. 8 is a fragmentary view showing a self centering locking pin arrangement.
Figure 9:
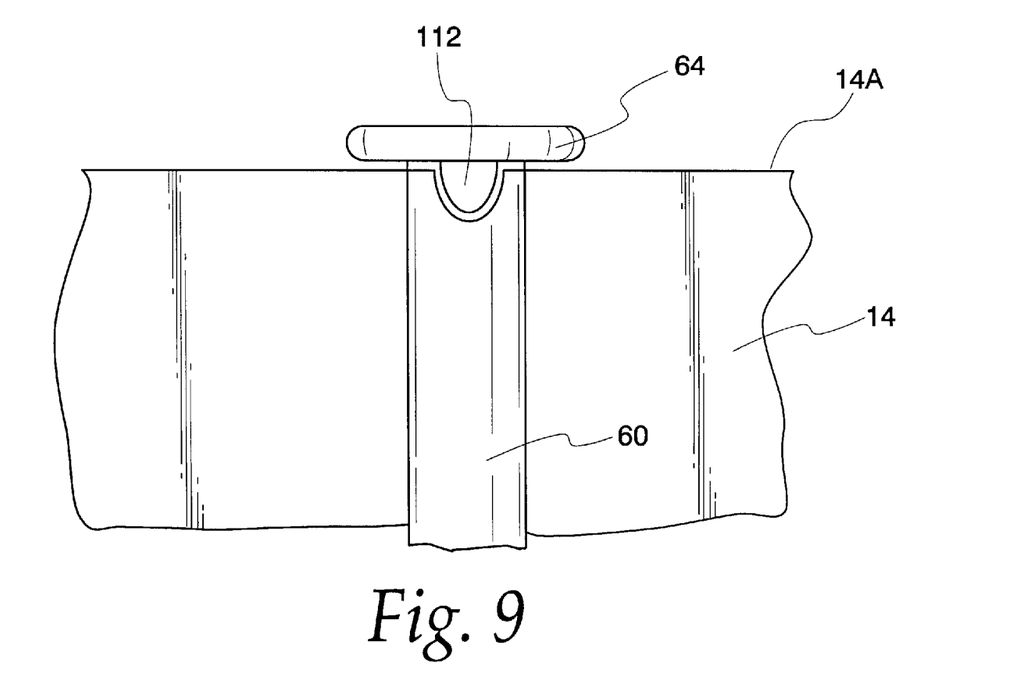
FIG. 9 is a view similar to that of FIG. 8 but showing a different s centering arrangement for the locking pin.

As an optional provision, enlarged head 64 of locking pin 60 can be provided with a pair of anti-rotation ears 112 received in slots 114 formed in sidewall 14a of arm 14. As shown in FIGS. 8 and 9, ears 112 are arranged in diametrically opposed positions and are configured to promote rocking or pivoting of the locking pin, with the exposed portion of the locking pin constrained to travel within a plane. The anti-rotation ears may operate alone to limit travel of the free end of the locking pin within a plane, or they may cooperate with elongated slots 72 in this regard.

Referring now to FIG. 10, a sign assembly 200 includes a flexible sign panel 202 mounted on an upright support 24 which spans the upper and lower corners of the sign panel. The remaining horizontal corners of the sign panel are supported by a cross member (not visible) attached to upright 204. Upright 204 is releasably joined to a base fitting 206 which includes a hood 208 partially enclosing a coil spring 210. The spring 210 and hood 208 are mounted between upright walls 22 of foldable supporting device 10.

In FIG. 10, the operator 220 is located on the "outside" portions of legs 14 with the operator's foot 222 located immediately adjacent the protruding portions 62 of locking pin 60. Thus, it is possible for the operator to engage exposed portion 62 with a shoe tip.

An advantage is offered by the present invention in restricting travel of the locking pin to a single direction. With reference to FIG. 6, it will be observed that locking pin 60 is, in its locked position, biased against one end 72a of slot 72. Thus, an operator who is not intimately familiar with the supporting device can safely nudge the exposed portion of the locking pin to determine the direction of travel permitted to it. If, with reference to FIG. 6, the operator should attempt to move the exposed portion 62 of the locking pin to the right, the locking pin will be supported by end 72a of slot 72 which will prevent unintended damage. The operator will then be prompted to move the locking pin in the opposite direction, as shown in FIG. 7, which, with sufficient travel of the locking pin free end, will free the leg for travel to the folded position. If desired, the length of slot 72 can be chosen such that, with reference to FIG. 7, the locking pin will be constrained from slot 72 from over travel, and this alone may be sufficient to prevent overbending of flat spring 52. As mentioned, the flat spring can also be provided with the hook-shaped stop limit, described above.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A foldable supporting device comprising:
   a base member including a plurality of support flanges having respective outer peripheries;
   a plurality of legs pivotally mounted to respective support flanges for pivotal movement between operational and storage positions;
   said legs defining a slot for receiving portions of a respective support flange outer periphery as the leg is pivoted between unfolded and folded positions;
   the outer peripheries of the support flanges defining at least one locking recess;
   a plurality of locking pins extending through respective legs, the locking pins having an elongated double-ended body with an enlarged head at one end lying outside the leg and an exposed portion at the other end extending beyond the leg;
   the locking pins carried by the legs so as to be positioned adjacent the support flange outer periphery and so as to be movable between a locked position received in the locking recess and an unlocked position outside of the locking recess;
   a plurality of spring bias means carried on respective legs so as to urge the locking pin body into the recess to lock the leg against pivoting about the support flange;
   the locking pin movable out of the recess when the exposed portion is deflected so as to oppose the force of the spring bias means;
   the spring bias means comprises a spring strip of flat spring material having first and second ends; and the first end of the spring strip being fastened to the leg at the point of pivotal mounting to the support flange.

2. The foldable supporting device of claim 1 further comprising a bolt fastener extending through the spring strip, the leg and the support flange to pivotally mount the leg to the support flange.

3. The foldable supporting device of claim 1 wherein the legs have opposed outside surfaces, and the spring strip is fastened to one outside surface of the leg.

4. The foldable supporting device of claim 1 wherein the legs have opposed outside surfaces, and the spring strip has an offset, spacing the second end of the spring strip away from the outside surface of the leg.

5. The foldable supporting device of claim 4 wherein the enlarged head of the locking pin is held between the second end of the spring strip and the outside surface of the leg.

6. The foldable supporting device of claim 5 wherein one outside surface of the leg defines a hole and the other outside surface of the leg defines a slot, with the locking pin extending through the leg, passing through the hole and the slot, with the enlarged head of the locking pin adjacent the hole.

7. The foldable supporting device of claim 6 wherein the spring strip urges the locking pin enlarged head into engagement with one of the leg outer surfaces.

8. The foldable supporting device of claim 7 wherein, with the locking pin in the locked position, the spring strip urges the exposed portion of the locking pin adjacent one end of the slot.

9. The foldable supporting device of claim 6 further comprising anti-rotation means carried on the locking pin and engageable with the leg to prevent rotation of the locking pin with respect to the leg.

10. The foldable supporting device of claim 6 further comprising stop limit means carried at the second end of the spring strip and engaging the leg to limit movement of the second end of the spring strip away from the outside surface of the leg.

11. The foldable supporting device of claim 10 wherein the leg comprises at least one leg wall defining a hollow tube and said captive means comprises a hook portion passing through the at least one leg wall.

12. A sign stand assembly having a foldable supporting device, an upright member extending from the foldable supporting device and a sign panel carried by the foldable member, the foldable supporting device comprising:

a base member including a plurality of support flanges having respective outer peripheries;

a plurality of legs pivotally mounted to respective support flanges for pivotal movement between operational and storage positions;

said legs defining a slot for receiving portions of a respective support flange outer periphery as the leg is pivoted between unfolded and folded positions;

the outer peripheries of the support flanges defining at least one locking recess;

a plurality of locking pins extending through respective legs, the locking pins having an elongated double-ended body with an enlarged head at one end lying outside the leg and an exposed portion at the other end extending beyond the leg;

the locking pins carried by the legs so as to be positioned adjacent the support flange outer periphery and so as to be movable between a locked position received in the locking recess and an unlocked position outside of the locking recess;

a plurality of spring bias means carried on respective legs so as to urge the locking pin body into the recess to lock the leg against pivoting about the support flange; and the locking pin movable out of the recess when the exposed portion is deflected so as to oppose the force of the spring bias means;

the spring bias means comprises a spring strip of flat spring material having first and second ends; and the first end of the spring strip is fastened to the leg at the point of pivotal mounting to the support flange.

13. The sign stand assembly of claim 12 further comprising a bolt fastener extending through the spring strip, the leg and the support flange to pivotally mount the leg to the support flange.

14. The sign stand assembly of claim 12 wherein the legs have opposed outside surfaces, and the spring strip is fastened to one outside surface of the leg.

15. The sign stand assembly of claim 14 wherein the legs have opposed outside surfaces, and the spring strip has an offset, spacing the second end of the spring strip away from the outside surface of the leg.

16. The sign stand assembly of claim 15 wherein the enlarged head of the locking pin is held between the second end of the spring strip and the outside surface of the leg.

17. The sign stand assembly of claim 16 wherein one outside surface of the leg defines a hole and the other outside surface of the leg defines a slot, with the locking pin extending through the leg, passing through the hole and the slot, with the enlarged head of the locking pin adjacent the hole.

18. The sign stand assembly of claim 17 wherein the spring strip urges the locking pin enlarged head into engagement with one of the leg outer surfaces.

19. The sign stand assembly of claim 18 wherein, with the locking pin in the locked position, the spring strip urges the exposed portion of the locking pin adjacent one end of the slot.

20. The sign stand assembly of claim 17 further comprising anti-rotation means carried on the locking pin and engageable with the leg to prevent rotation of the locking pin with respect to the leg.

21. The sign stand assembly of claim 17 further comprising stop limit means carried at the second end of the spring strip and engaging the leg to limit movement of the second end of the spring strip away from the outside surface of the leg.

22. The sign stand assembly of claim 21 wherein the leg comprises at least one leg wall defining a hollow tube and said captive means comprises a hook portion passing through the at least one leg wall.

* * * * *